E. E. BUTLER.
POWER TRANSMITTING DEVICE.
APPLICATION FILED OCT. 1, 1912.
1,149,339.
Patented Aug. 10, 1915.
3 SHEETS—SHEET 3.
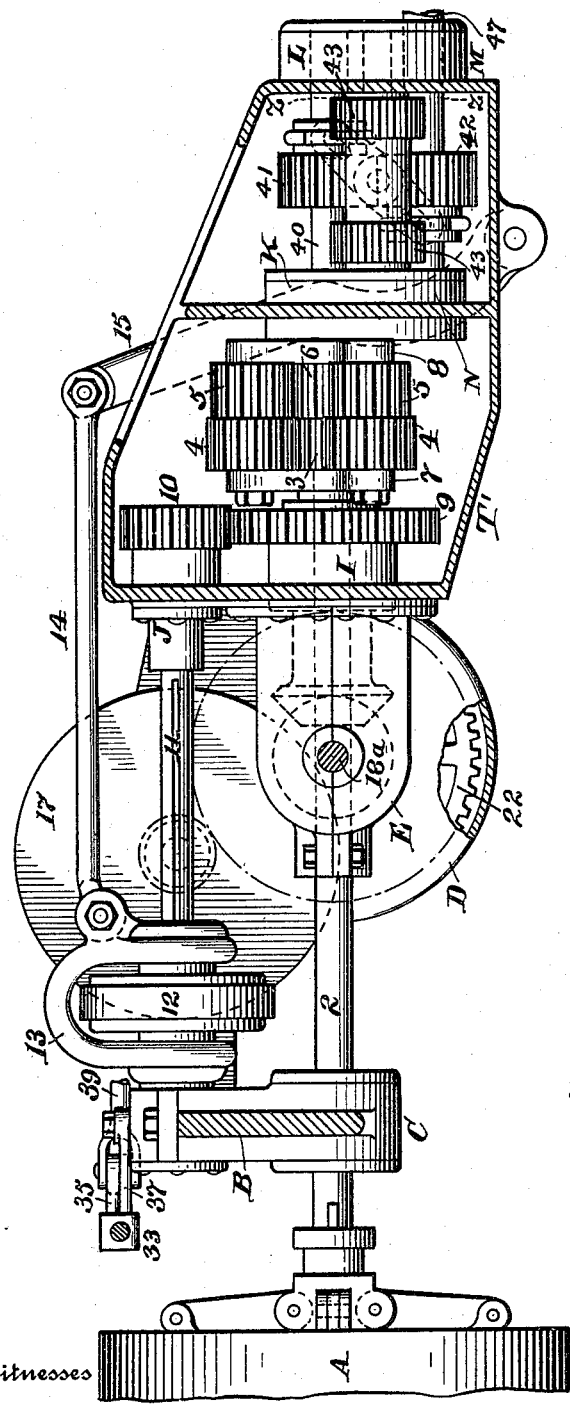
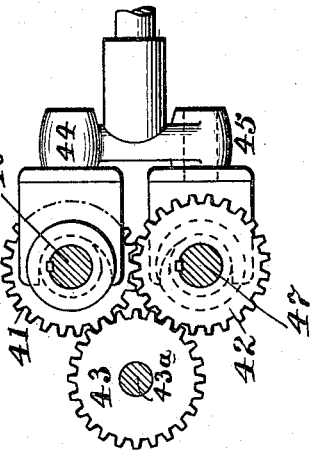
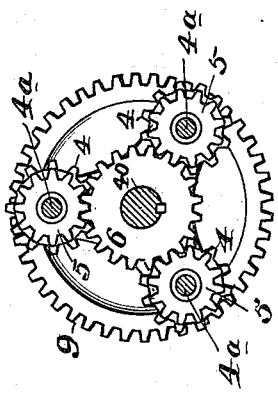
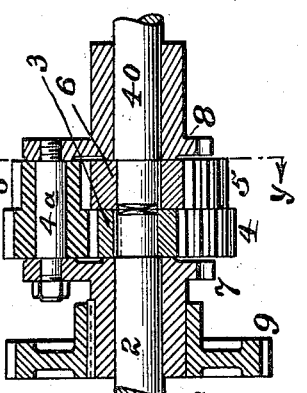
Witnesses
Daniel Webster, Jr.
E. W. Smith
Inventor
Edward E. Butler
By [signature]
Attorney

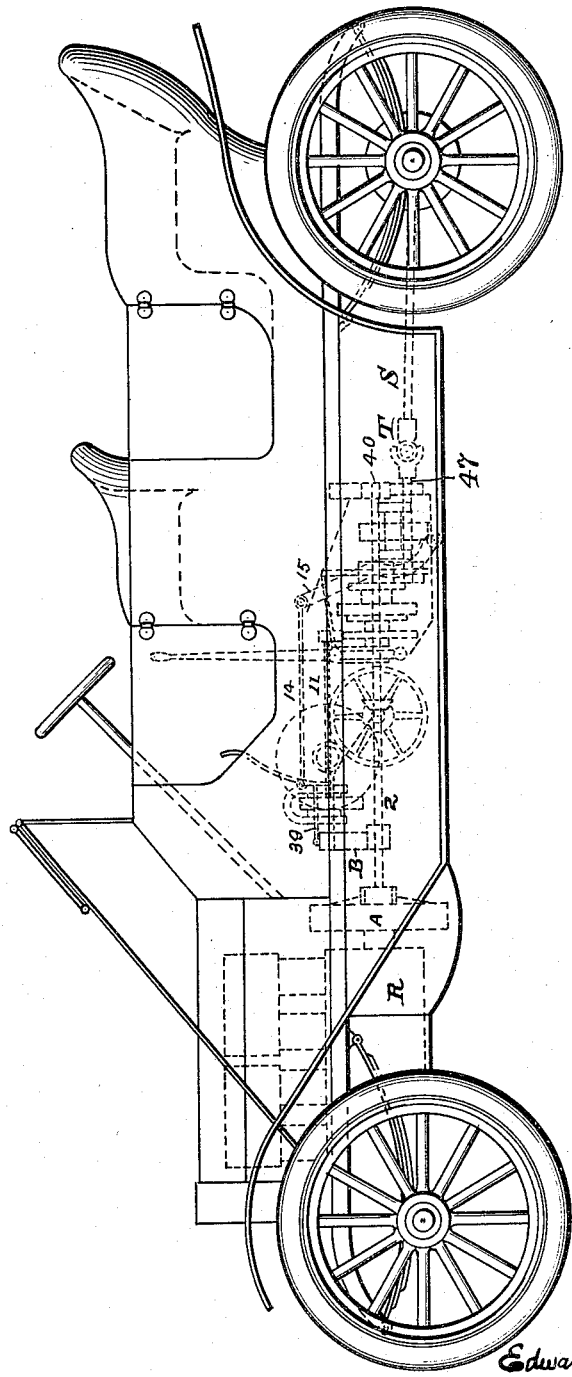

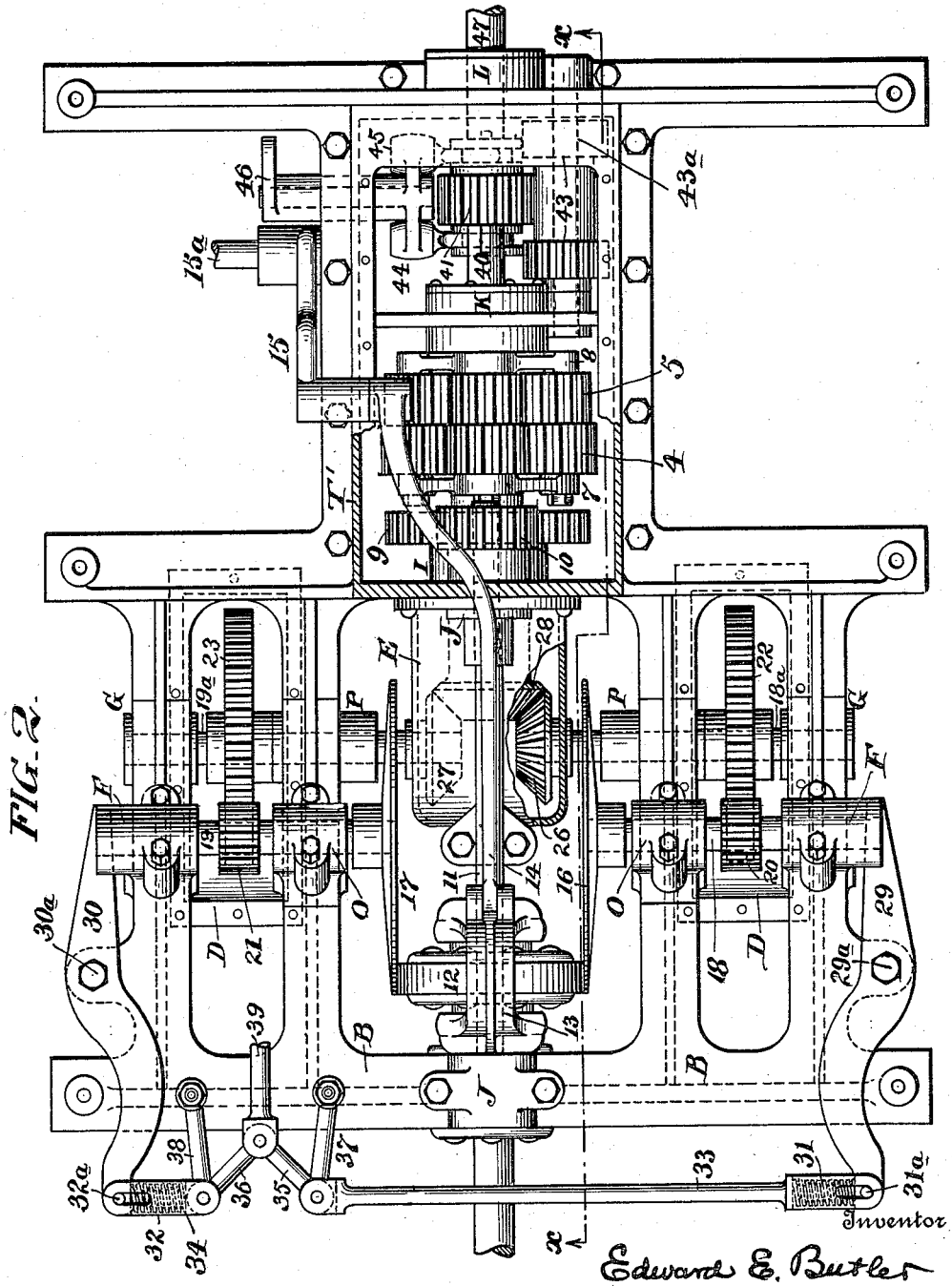

UNITED STATES PATENT OFFICE.

EDWARD E. BUTLER, OF CHATTANOOGA, TENNESSEE.

POWER-TRANSMITTING DEVICE.

1,149,339.   Specification of Letters Patent.   Patented Aug. 10, 1915.

Application filed October 1, 1912. Serial No. 723,272.

*To all whom it may concern:*

Be it known that I, EDWARD E. BUTLER, citizen of the United States, and resident of Chattanooga, county of Hamilton, and State of Tennessee, have invented an Improvement in Power-Transmitting Devices, of which the following is a specification.

The object of my invention is to provide a suitable construction of transmission gearing to be employed between the driving power and the object to be driven, which shall have capacity for varying the speed and power applied to the driven object within wide limits and under gradual variations at the will of the operator.

Broadly stated, my invention comprehends power transmitting means between the source of power and the object to be driven, combined with variable speed mechanism operated by the power transmitting means, and controlling under the governing influence of the operator, the speed and power of the transmitting gearing.

More specifically defined, my improvements comprehend features which may be defined as follows:

The power from the engine is transmitted to the main transmission shaft by means of a friction clutch, which allows the operator to throw the power into or out of action at will. The main shaft, on which the clutch is located, passes through suitable bearings and into the gear case and is fitted on its end with a pinion which meshes into three compound gears equally spaced around the pinion and carried in a housing that runs freely on main and secondary shafts.

The compound or differential gearing is composed of three sets of two gears each of different diameters, but made fast together and sets of gears of different diameters meshing into their respective pinions on the terminus of the aforesaid main shaft and a secondary shaft in the differential gear case. On the hub of the housing is fitted to and made fast a gear of suitable size to mesh into a pinion on a friction driven shaft. The friction driven shaft passes through suitable bearings and is fitted with a sliding friction wheel and yoke located intermediate of and in diametrical alinement with two friction disks, which are geared to the main shaft in a manner that runs them in opposite directions at a given ratio of speed. The tension of the friction disks against the friction driven wheel is controlled by a special lever arrangement so constructed as to allow even and equal pressure to be applied to each disk shaft at the same time. In the rear or back end of the gear case is located a pair of sliding gears, one is fitted by feather key to the secondary shaft and meshes into one of similar construction keyed to the knuckle shaft in like manner, and said gears are operated by a foot lever, by pulling the two sliding gears out of mesh and into mesh with an especially constructed double gear, which will rotate the knuckle shaft in the opposite direction, thus providing a reverse gearing.

My invention not only includes a mechanical structure whereby an improved method of obtaining a higher efficiency in a friction controlled drive, as provided, but also a wider range of variation in speed and power, and especially in providing capacity for producing these variations in a very gradual manner to suit the varying conditions under which the load is to be operated.

My invention is more fully described hereinafter and the special features of improvement are defined in the claims.

Referring to the drawings: Figure 1 is a side elevation of an automobile illustrating my invention as applied thereto, by way of example; Fig. 2 is a plan view of my improved power transmission gearing, suitable for use in an automobile; Fig. 3 is a longitudinal sectional elevation of the same taken on line $x$—$x$ of Fig. 2; Fig. 4 is a vertical section through the compound gearing and its connections; Fig. 5 is a transverse sectional elevation of the said compound gearing taken on line $y$—$y$ of Fig. 4; and Fig. 6 is a transverse section of the reverse gearing mechanism taken on line $z$—$z$ of Fig. 3.

R is the engine or source of power and transmits motion to the main driving shaft 2 through a suitable clutch A, which may be of any ordinary construction. The power transmitted by the shaft 2 is ultimately delivered to a shaft 47, which delivers power to the knuckle shaft S through the universal coupling T, and the said knuckle shaft employed to drive the rear driving wheels of an automobile. These parts are shown in Fig. 1 and are given as an illustration of the use of my invention in connection with an automobile, but it is to be understood that my improvements are in no wise confined to any particular use, and the improvements are more directly included between the main driving shaft 2 and the driven shaft 47, since it is immaterial what the primary source of power may be or what the ultimate driven object may be.

More specifically, the transmission mechanism may be described as follows: The main frame B is provided with suitable bearings C and I, in which the main driving shaft 2 is journaled. Also journaled in the same frame B by bearings J is a friction driven shaft 11, which shaft is provided on its end with a pinion 10 meshing with a spur wheel 9 which rotates the housing of a differential gear mechanism. Upon the friction driven shaft 11 is arranged a sliding yoke 13 and journaled in the yoke, and connected with the shaft 11 through a feather and groove construction of any ordinary kind, is a friction wheel 12, the construction being such that the said friction wheel may be moved longitudinally along the shaft 11 while maintaining its connection with the shaft so as to positively rotate the shaft. The yoke 13 is operated by a link 14 and bell crank 15, which latter may be manipulated by any suitable lever mechanism, such as shown for example in Fig. 1. On each side and in line with the friction wheel 12, is located a friction disk, one of these disks being indicated at 16 and the other at 17, and said disks press upon the opposite edges of the friction wheel 12 and rotate in opposite directions, so as to simultaneously act to rotate the friction wheel 12. The friction disk 16 is secured to a shaft 18 journaled in bearings O F on the main frame B and provided with a pinion 20. The pinion 20 meshes with a spur wheel 22 on a shaft 18ª which is journaled in bearings G P on the same main frame B. The inner end of this shaft 18ª is secured to a bevel gear 26 which meshes with a bevel gear 28 secured to the main driving shaft 2. Similarly, the disk 17 is secured to a shaft 19 journaled in bearings O F and is provided with a pinion 21, said pinion 21 meshing with a gear 23 on a shaft 19ª which is journaled in bearings G P and provided in its end with a bevel gear 27, also meshing with the bevel gear 28 on the main driving shaft 2. It will be seen from this construction that when the driving shaft 2 rotates, the gearing, just described, will rotate the disks 16 and 17 in opposite directions and at the same speeds. From this it follows that any rotation to the driving shaft 2 imparts a corresponding rotation to the friction driven shaft 11, and it is preferable that the speed of the shaft 11 will be higher than the speed of the driving shaft 2.

The friction disks 16 and 17 are pressed upon the friction wheel 12 in any suitable manner, but the particular mechanism illustrated by way of example, may be described as follows:

The shafts 18 and 19 of the friction disks 16 and 17 are free to move longitudinally in their bearings O F, and they are operated in a direction toward each other by levers 29 and 30, respectively fulcrumed at 29ª and 30ª on the main frame B. The opposite ends of the levers 29 and 30 are respectively connected with links 33 and 34 by pins 31ª and 32ª extending through slots in the links. These links are also provided with springs 31 and 32 to hold the pins in the ends of the slots and to apply spring pressure to the levers 29 and 30. The two links 33 and 34 are connected by a toggle comprising links 35 and 36 which may be operated at their jointed connection by a reach rod 39. The toggle is maintained in operative position by means of the two small radial links 37 and 38. The reach rod 39 may be operated by a foot treadle or other means. When the toggle is operated to aline the links 35 and 36, spring pressure is applied to the levers 29 and 30 with the result that the disks 16 and 17 are spring pressed against the periphery of the friction wheel 12.

Suitable casings D may be arranged about the gears 22 to protect them from dirt, and likewise a gear box E may be placed about the bevel gears 26, 27 and 28.

The driving shaft 2 drives a secondary shaft 40 by means of the differential gearing which is more fully shown in Figs. 3, 4 and 5. On the end of the shaft 2 is secured a pinion 3, and upon the adjacent end of the secondary shaft 40 is secured a gear 6. This pinion 3 and gear 6 are geared together through compound gears 4 and 5 which are preferably made integral, and are journaled upon shafts 4ª carried in the carrier frame 7 and 8 which is partly journaled upon the shaft 2 and partly on the shaft 40. For mechanical reasons, I prefer to provide three of the differential gears 4 and 5 arranged about the gears 3 and 6, as shown in Fig. 5. Secured to the frame 7 is the gear 9 to which I have before referred as being driven by the pinion 10 of the friction driven shaft 11. It will now be seen that the rotation of the shaft 2 will rotate the shaft 40 at a somewhat lower speed so long as the frame 7 and the gear 9 remain stationary, but any rotary movement of these parts which carries the compound gears around the shafts, will vary the speed of the shaft 40 with a given speed of the shaft 2. This variation is secured by varying the speed of rotation of the frame 7 and its compound gears about the shafts 2 and 40 by means of the friction driven shaft 11. It will be understood that while I prefer to have the gears 3 and 6 of different diameters and similarly, gears 4 and 5 of different diameters inversely arranged, this is not at all essential to the broad principle of my invention, as it will suffice to have the two shafts 2 and 40 geared together and depend solely upon the speed of rotation of the gears 4 and 5 and the frame carrying them.

The secondary shaft 40 is journaled in bearings K and L and is provided with a gear 41 which by means of a key and groove may slide longitudinally upon it under the manipulation of a yoke 44. Journaled in the bearings N and M is a driven shaft 47, and this shaft is parallel to the shaft 40 and likewise provided with a gear 42 having a sliding connection with it by a key and groove, and similarly operated by means of a yoke 45. These two gears 41 and 42 may directly mesh, so that the driven shaft 47 is directly rotated from the secondary shaft 40 through these gears. To reverse the direction of rotation of the driven shaft 47, I provide a double gear 43 journaled on a shaft 43$^a$ to one side of the shaft 40, and by the operation of the yokes 44 and 45 by means of a rock shaft and lever 46, the gears 41 and 42 may be shifted so as to move out of contact and respectively mesh with the gears 43, in which case the driven shaft will be rotated in the opposite direction. This gearing constitutes a form of reverse gearing, but any other suitable reverse gearing mechanism may be employed in lieu thereof. The reverse gearing and the differential gearing are inclosed in a suitable case, indicated at T', which would be employed in automobiles to keep the dirt and dust out of the gearing.

When the power is transmitted into the main shaft by means of the clutch previously described, the two disks will take up their speed in proportion to the ratio of the gearing between the disks and the main shaft. The main drive pinion in the differential gearing, being keyed to the terminus of the main shaft and meshing with the compound gears, drives the frame or planet gear carrier in a direction opposite to that of the main frame, with a speed equal to the difference in ratio of the differential gears. In other words, if the planet carrier that carries the compound gears is rotated at a speed corresponding to the ratio of the pinions on the main shaft and the secondary shaft, the secondary shaft will remain in a stationary position regardless of the speed of the main shaft, but the moment the friction wheel is moved in from the outer or unison position toward the center of the disk, the speed of the differential gear carrier is reduced in proportion to the change of ratio of the friction wheel and disk.

If the friction wheel 12 is brought to a central position on the disks 16 and 17, all members connecting with the friction wheel, and hence the housing 7 and 8 of the compound gears, will be stationary, and the gears 4 and 5 will run as idlers on stationary bearings, and at this time the power will be transmitted from shaft 2 to shaft 40 at a speed ratio of about 4 to 5. If the friction wheel 12 is moved to the extreme outer position (Figs. 2 and 3), the speed of the carrier of the compound gears will become equal to the speed due to the ratio of the speeds of the shafts 2 and 40, and the transmission of power will be through the main shaft 2 to the pinion 3 and compound gears 4 and 5, and thence to shaft 40; and this will be modified or controlled by power transmitted from the main shaft 2 through the disks 16 and 17, the friction wheel 12, its shaft 11, the pinion 10, gear 9 and carrier frames 7 and 8 which carry the compound gears 4 and 5 about the shafts, and under which condition, the secondary shaft 40 may be brought to a condition of rest. If the friction wheel is moved in any intermediate positions over the disks so as to drive the carrier frame 7 and 8 at speeds intermediate of a condition of rest and maximum speed, it will decrease the possible maximum speed of the secondary shaft in proportion as the friction wheel and its shaft 11 are increased in speed. If the friction wheel 12 is shifted to drive the carrier frame 7 and 8 at a speed greater than the speed ratio of the shaft 2 and secondary shaft 40 with the carrier frame at rest, the secondary shaft would rotate in opposite direction to the main shaft 2; but if the friction wheel is shifted to the edge of the disks to make the ratio of the shafts 2 and 40 unity (when the friction wheel is running at its highest speed) the secondary shaft 40 will be at rest or zero, and will increase in speed in the same direction, as the main shaft 2 is running in proportion to the decrease of speed of the friction wheel, and this will continue until the center of the disks 16 and 17 are passed by the friction wheel.

From the center of the disks 16 and 17 to the inside limit of travel, the friction wheel 12 will be rotating in a reverse direction, as will also all members connecting with the friction wheel and including the carrier frame 7 and 8. This being the case, the compound gears will be revolved in the same direction as the shaft 2, and the secondary shaft 40 will be given an increase of speed equal to the ratio of speed of the carrier 7 and 8 over the main shaft 2 less the loss due the compounding of the differential gears.

It will thus be seen that a wide variation in speed and power may be obtained by the employment of my improvements, and the changes may be performed in so gradual manner that no shock or jar will come upon the machinery or the occupants of the automobile in case the mechanism is employed therefor.

While I have shown my improvements in a practical construction adapted for automobiles, I do not restrict myself in any manner to these details, as they may be modified in various ways without departing from the spirit of the invention.

Having now described my invention, what I claim as new and desire to secure by Letters Patent, is:—

1. In a power transmitting mechanism the combination of a driving shaft, a driven shaft, differential gearing between the shafts having a rotatable carrier, a friction shaft out of alinement with the driving shaft but parallel to it, gearing between the friction shaft and the carrier for rotating the latter, a friction wheel rotating with the friction shaft and adjustable longitudinally thereon and above the driven shaft, two friction disks respectively on opposite sides of the friction wheel and rotating in opposite directions for rotating the friction wheel, said disks having shafts at right angles to the friction shaft and in a different plane from that of the driving shaft, gearing between the shafts of the friction disks and the driving shaft whereby they are rotated, hand controlled means for forcing the disks into close frictional contact with the friction wheel, and hand controlled means for adjusting the position of the friction wheel along the friction shaft and between the disks for varying the rotation of the friction shaft and the carrier of the differential gearing, whereby the driven shaft may be rotated at various speeds from a constant speed of the driving shaft.

2. In a power transmitting mechanism the combination of a driving shaft, a driven shaft, differential gearing between the shafts having a rotatable carrier, a friction shaft located adjacent said driving shaft, gearing between said friction shaft and said carrier operable by said friction shaft for rotating said carrier, a friction wheel mounted for rotation with said friction shaft and adjustable longitudinally thereon, two friction disks respectively on opposite sides of said friction wheel and adapted to rotate said wheel by frictional contact, gearing between the respective shafts of said friction disks and the driving shaft arranged to rotate said disks in opposite directions, means operable at will for varying the frictional contact of said disks with said friction wheel, and means for adjusting the position of said friction wheel upon its shaft and between said disks for varying the rotational speed of the friction shaft and the carrier of the differential gearing, whereby the driven shaft may be rotated at various speeds while the speed of the driving shaft remains constant.

3. In a power transmitting mechanism, the combination of a driving shaft, a driven shaft, differential gearing between the shafts having a rotatable carrier, a friction shaft located adjacent said driving shaft, gearing between said friction shaft and said carrier operable by said friction shaft for rotating said carrier, a friction wheel mounted for rotation with said friction shaft, two friction disks respectively on opposite sides of said friction wheel and adapted to rotate said wheel by frictional contact, gearing between the respective shafts of said friction disks and the driving shaft arranged to rotate said disks in opposite directions, and means for adjusting the position of said friction wheel between said disks for varying the rotational speed of the friction shaft and the carrier of the differential gearing, whereby the driven shaft may be rotated at various speeds while the speed of the driving shaft remains constant.

4. In a power transmitting mechanism, the combination of a driving shaft, a driven shaft, differential gearing between the shafts having a rotatable carrier, a friction shaft located adjacent said driving shaft, gearing between said friction shaft and said carrier operated by said friction shaft for rotating said carrier, a friction wheel mounted on said friction shaft, two friction disks respectively on opposite sides of said friction wheel and adapted to rotate said wheel by frictional contact, gearing between the respective shafts of said friction disks and the driving shaft arranged to rotate said disks in opposite directions and at a different speed than the speed of said driving shaft, and means to shift said friction wheel relative to said disks to vary the angular velocity of said friction shaft and said rotatable carrier, whereby the driven shaft may be rotated at various speeds while the speed of the driving shaft remains constant.

In testimony of which invention, I hereunto set my hand.

EDWARD E. BUTLER.

Witnesses:
R. J. CRIMMINS,
C. D. REDMOND.

Copies of this patent may be obtained for five cents each, by addressing the "Commissioner of Patents, Washington, D. C."